(12) United States Patent
Dapelo et al.

(10) Patent No.: US 7,003,201 B2
(45) Date of Patent: Feb. 21, 2006

(54) FLEXIBLE FACTORY JOINT FOR METALLIC TUBES WHICH ENCLOSE LOOSELY INSIDE THEM OPTICAL FIBERS AND ITS METHOD OF CONSTRUCTION

(75) Inventors: Aldo Dapelo, Loutraki Corinthias (GR); Athanasios Petrakis, Nikaia (GR); Ioannis Paizis, Loutraki Corinthias (GR); Ioannis Stathatos, Ag. Theodori Corinthias (GR)

(73) Assignee: Fulgor Greek Electric Cables S.A., Halandri (GR)

( * ) Notice: Subject to any disclaimer, the term of this patent is extended or adjusted under 35 U.S.C. 154(b) by 122 days.

(21) Appl. No.: 10/681,312

(22) Filed: Oct. 9, 2003

(65) Prior Publication Data

US 2005/0078923 A1 Apr. 14, 2005

(51) Int. Cl.
*G02B 6/44* (2006.01)
*G01I 3/18* (2006.01)
*G01N 33/28* (2006.01)

(52) U.S. Cl. ............... 385/109; 250/227.16; 356/70; 385/147

(58) Field of Classification Search ......... 385/100–110, 385/12, 13, 14; 250/227.16, 227.18, 227.14; 356/32
See application file for complete search history.

(56) References Cited

U.S. PATENT DOCUMENTS

| | | | | |
|---|---|---|---|---|
| 4,427,262 A | * | 1/1984 | Oldham | 385/71 |
| 4,699,459 A | * | 10/1987 | Priaroggia | 385/69 |
| 4,708,427 A | * | 11/1987 | Ejiri et al. | 385/87 |
| 4,722,588 A | | 2/1988 | Priaroggia | |
| 5,076,657 A | | 12/1991 | Toya et al. | |
| 5,196,898 A | * | 3/1993 | Tamura et al. | 356/70 |
| 6,384,404 B1 | * | 5/2002 | Berg | 250/227.16 |

FOREIGN PATENT DOCUMENTS

| | | |
|---|---|---|
| DE | 28 49 057 A | 5/1980 |
| EP | 0 523 920 A2 | 1/1993 |
| EP | 0 690 321 A1 | 1/1996 |
| EP | 1 013 849 A1 | 6/2000 |
| JP | 04093904 A | 3/1992 |

* cited by examiner

*Primary Examiner*—Akm Enayet Ullah
(74) *Attorney, Agent, or Firm*—Birch, Stewart, Kolasch & Birch, LLP

(57) ABSTRACT

Flexible joint which is used for the repair during the production of metallic tubes which enclose loosely inside them optical fibers, surrounded by a suitable filling material or for the connection of long lengths of the above mentioned tubes during the manufacturing of submarine cables which contain these tubes. The joint comprises a connecting metallic tube (6), which connects externally with overlapping at its ends the metallic tubes (3, 10) after splicing is performed between the optical fibers which they enclose and which are separated in bundles (1, 2). The mechanical connection of the joint is achieved through plastic deformation of the over-applied connecting metallic tube by creating grooved rings (11) at the sections where it overlaps the metallic tubes to be connected (3,10). The water tightness of the joint is obtained by welding the ends (8) of the over-applied connecting metallic tube (6) to the external surface of the metallic tubes to be connected (3, 10). In the case the metallic tubes carry a plastic coating (4), this is restored in the area of the joint (9, 5).

10 Claims, 8 Drawing Sheets

FLEXIBLE FACTORY JOINT FOR METALLIC TUBES WHICH ENCLOSE LOOSELY INSIDE THEM OPTICAL FIBERS AND ITS METHOD OF CONSTRUCTION

The present invention refers to a flexible factory joint which is used for connecting long lengths of metallic tubes which enclose loosely inside them optical fibers surrounded by a suitable filling material, so that the total lengths of the above mentioned connected tubes will be sufficient for the manufacturing of long lengths of submarine cables, and its method of construction. The above tubes are placed at the center of the cables during the production of optical fiber submarine cables or are stranded together with the insulated conductors during the production of composite power-telecommunication submarine cables, which contain optical fibers.

As used throughout the specification, metallic tubes, which enclose optical fibers, will refer to metallic tubes, which enclose loosely inside them optical fibers, said optical fibers being surrounded inside the tubes by a suitable filling material.

The metallic tubes, which enclose optical fibers and used in telecommunication applications, are made of steel, copper or aluminum alloy. These tubes have different internal and external diameters, depending on the application and the number of the enclosed optical fibers.

They are produced using metallic tapes which are properly shaped in order to take the form of a tube, while the optical fibers as well as a suitable filling material which surrounds and protects them against possible moisture penetration or mechanical stress, are placed simultaneously inside the formed tube. The two opposite edges of the tape are then seam welded resulting to a hermetically sealed tube.

Inside the tube the optical fibers are placed with a controlled excess length, which means that inside any length of the tube, the length of the enclosed optical fibers is greater by a specific percentage. The continuous length of the metallic tubes, which are produced today with the above-mentioned method amounts to 50 kilometers.

The submarine cables, which contain the metallic tubes that enclose optical fibers, are used in submarine links that greatly exceed 50 kilometers in length. Consequently, it is necessary that the metallic tubes as well as the optical fibers, enclosed therein, be connected between each other in order to achieve the desirable final lengths. This connection is realized with the use of factory joints.

The factory joints, which are used to date, are of the connecting cylindrical box type or of the flexible tube type. The latter, is placed internally or externally with partial overlapping to bridge the opposite ends of the connected metallic tubes.

The cylindrical connecting box type joints consist of a hermetically sealed cylindrical box at the ends of which, the two metallic tubes to be connected enclosing the optical fibers, are entered and properly fixed. Inside the empty space of the box the optical fibers are spliced and properly arranged. At the ends of the connecting box, all the successive protective layers of the cable terminate and the armoring of the cable consisting of galvanized steel wires is properly secured. This way the optical, electrical and mechanical continuity of the cable is achieved.

In this type of joint, used by a number of submarine cable manufacturers, the connection is not realized during the production process of the submarine cable but after the completion of the production of independent cable lengths. Also, the joint and the method followed during its construction are similar to the respective submarine repair joint and its method of construction, which are used for the restoration of damages on the completed cable. Consequently, it is not possible with this joint to repair faults during the production of the metallic tubes enclosing optical fibers.

During the construction of the joint the successive protective layers of the cable over the metallic tube terminate and are secured at either side of the joint. Therefore, it is not feasible to achieve over the joint the continuity of the galvanized steel wires of the armoring, which provide the mechanical strength, thus resulting to a partial reduction of the mechanical strength of the cable at the position of the joint.

The above-mentioned joint comprises a large number of parts, while a significant amount of time is required for the assembly of these parts and the completion of its construction. Also, a large number of special tools is required for this purpose.

Furthermore, it must be noted that the external diameter of the joint in the area of the connection is a lot larger than the external diameter of the cable, the length of the joint is sufficiently large when compared to the external diameter of the cable and the joint is much more rigid when compared to the cable the two ends of which it connects. The above result to handling difficulties of the connecting box type joints during the storage, the loading on board the cable vessel which will perform the installation, and the installation of the cables, and more specifically in the case where cable burial on the seabed is required.

Consequently, during the above-mentioned operations, problems may arise due to the size and the stiffness of the joints when compared to the rest of the cable.

Finally, because of their size and stiffness, the cylindrical connecting box type factory joints are not possible to be used during the manufacturing of composite power-telecommunication submarine cables, which contain metallic tubes enclosing optical fibers.

A second method for connecting metallic tubes enclosing optical fibers is the one performed with the use of a metallic tube, which is fitted internally to the opposite ends of the two metallic tubes to be connected. Such a method is described in U.S. Pat. No. 4,580,874. The external diameter of the above mentioned tube is smaller than the internal diameter of the metallic tubes to be connected.

During this method of connection the metallic tube, which will be used for connecting the metallic tubes enclosing optical fibers is initially placed internally at its whole length inside one of the two tubes to be connected.

The optical fibers are then spliced followed by the transfer of the tube over the optical fibers and its placement at the final position of the connection so that it bridges the two metallic tubes to be connected. At the final position the ends of the connecting tube are overlapped externally by the two tubes to be connected. The mechanical strength of the connection is achieved preferably by the use of a sealing material such as a solder which is applied in the existing gap at the overlapping positions, as described above, between the internal surface of the tubes enclosing the optical fibers and the external surface of the connecting tube.

The space provided, by this method, for the optical fibers inside the connecting tube is smaller than the space available inside the connected metallic tubes. By this way and especially in the case of metallic tubes of small internal diameter, the excess length of the optical fibers inside the connecting tube is possible to be smaller than the excess length of the optical fibers inside the tubes themselves. The consequence of this, is a less favorable relation of elongation of the optical fibers under tensile load, which is applied for example during the installation of the cable in the area of the joint, in relation to the elongation of the optical fibers inside the rest of the cable.

Also, as the tube connecting the metallic tubes enclosing the optical fibers is initially placed at a considerable length inside one of said tubes, there is a possibility of damage being induced to the optical fibers, which are enclosed inside the tubes and are sensitive enough by construction. The same is possible to happen after the splicing of the optical fibers and the transfer of the tube internally through the first of the tubes to be connected, over the spliced optical fibers and inside the end of the second metallic tube.

In U.S. Pat. No. 5,076,657 a sleeve is used to connect two metal pipes containing optical fibers. This sleeve overlaps a portion of one metal pipe and is elongated to be connected to the other metal pipe. Alternatively the two metal pipes containing optical metal fibers are elongated and connected to each other at an overlapping portion. The connection, according to this invention, is effected by use of solder heated by electrodes or by laser light beam welding.

The internal diameter at the portions of overlapping between the connecting sleeve and the metal pipes or the metal pipes themselves is smaller than the internal diameter of the metal pipes and the connecting sleeve. At these portions, the space provided is smaller, and thus the freedom of movement of the optical fibers contained is reduced and may induce stress on them. This is more evident as the internal diameter of the metal pipes and the connecting sleeve is reduced, the thickness of the metal pipes and the connecting sleeve is increased and the number of the optical fibers included in the metal pipes is increased.

Furthermore, the welding, which is used to achieve the mechanical strength of the joint when performed by using a laser or electrodes requires specialized and complex devices. Also, before these welding operations begin the optimal conditions of welding using these devices have to be determined in order to avoid a damage on the optical fibers enclosed in the metallic tubes due to overheating at the points where the welding is applied. This results to an increase of the time required for the construction of the joint, while the avoidance of damage on the optical fibers is not completely secured since in practice it is not possible to perform welding with a simultaneous measurement of the temperature developed on the optical fibers inside the tubes during this operation.

Also, in other methods where a metal alloy welding is applied, it is possible to induce damage on the optical fibers, which is due to the use of a burner for the rather long period of time required for the completion of the welding.

Finally, as the connecting sleeve of the above-mentioned patent elongates over the spliced optical fibers with the purpose to be connected to the second metal pipe and/or as portions of the metal pipes containing the optical fibers are elongated to achieve overlapping before the connection, the exact lengths of elongation of the different connected parts must be predetermined in order to result to the exact excess fiber length which is required in the area of the connection. This method of achieving the required excess fiber length inside the joint is complicated, time consuming and sensitive to errors.

In some of the methods described in the above-mentioned patent, a tensile stress is applied on the included optical fibers in the area of the connection, resulting to the elongation of the optical fibers, which may be permanent.

It is an object of the present invention to provide a flexible factory joint, for connecting metallic tubes enclosing loosely inside them optical fibers, which ensures the desirable excess length of the optical fibers inside the joint, is simple in its construction and does not require for this purpose a great number of specialized tools as well as a method providing such a joint in a way that does not present any risks of damaging the enclosed optical fibers.

The invention provides a flexible factory joint for metallic tubes, which enclose loosely inside them optical fibers, comprising: first and second metallic tubes having internal and external diameter, which enclose loosely inside them optical fibers, said optical fibers surrounded by a suitable filling material, separated in one or more bundles and spliced together at their ends, and a connecting metallic tube having an internal and external diameter, said internal diameter being slightly larger than the external diameter of each of the first and second metallic tubes, placed in a way such that it encloses the spliced optical fibers and externally overlaps an end section of each of the above first and second metallic tubes, and is characterized in that the connecting tube is firmly connected to the first and second metallic tubes, at the sections at which it overlaps them, through the creation by plastic deformation of more than one grooved rings which have a diameter smaller than the external diameter of the connecting tube.

Also, the present invention provides a method for making a flexible factory joint for metallic tubes, which enclose loosely inside them optical fibers, comprising the following steps:

a. Providing first and second metallic tubes to be connected, having internal and external diameter, said tubes enclosing loosely inside them optical fibers surrounded by a suitable filling material and further providing a connecting metallic tube having an internal and external diameter, said internal diameter being slightly larger than the external diameter of each of the first and second metallic tubes, b. Positioning temporarily the connecting metallic tube along its whole length over the first metallic tube to be connected c. Cutting out sections at the ends of the metallic tubes to be connected in order to uncover the enclosed optical fibers d. Separating the optical fibers in one or more bundles each one of them including a maximum number of 12 optical fibers e. Cutting the fibers at predetermined lengths, depending on the number of the optical fibers enclosed inside the metallic tubes f. Splicing the optical fibers following commonly used methods for this purpose g. Arranging the metallic tubes to be connected after the splicing of the optical fibers, so that the fibers are horizontally aligned, and subsequently reducing the distance between them at a predetermined length, such that the optical fibers become loose and this way the desirable excess length of the optical fibers is ensured inside the joint.

h. Applying a filling material over the optical fibers, same as the one surrounding the optical fibers inside the metallic tubes to be connected.

i. Moving the connecting metallic tube over the first metallic tube to be connected, the spliced optical fibers and the second metallic tube to be connected so that it overlaps the ends of the metallic tubes to be connected by equal sections.

j. Securing the stability of the connection through the creation, by plastic deformation, at the sections at which the connecting metallic tube overlaps the metallic tubes to be connected, of more than one grooved rings which have a diameter smaller than the external diameter of the connecting tube k. Welding circumferentially the ends of the connecting tube to the external surface of the connected metallic tubes so that complete water tightness of the joint is achieved.

The placement of the connecting tube to externally overlap the ends of the connected tubes enclosing the optical fibers ensures to the joint of the present invention a greater space per unit length inside the connecting tube and between the ends of the connected tubes when compared to the joint where the connecting tube is placed internally to the connected tubes enclosing the optical fibers. This space is important for the arrangement of the required excess length of the optical fibers inside the joint, which provides the desirable relation of load on the cable—elongation of the optical fibers in the area of the joint. The importance of this space becomes more significant as the diameter of the metallic tubes enclosing the optical fibers becomes smaller and the number of the optical fibers increases.

Also, since in the present invention the above-mentioned connecting tube is placed externally, the possibility of inducing damage on the optical fibers during the movement of the connecting tube at the various phases of the construction of the joint is minimized.

In the present invention, contrary to some of the already known methods, the connecting tube is firmly connected to the first and second metallic tubes enclosing the optical fibers, exclusively through plastic deformation, which is applied only on the external surface of the metallic tubes. This way the development of high temperatures is avoided contrary to the cases where welding is used to achieve the mechanical strength of the connection, and thus the possibility of inducing damage on the optical fibers, due to the developed temperatures is substantially avoided.

Unlike the cylindrical connecting box type joint, which is used to connect completed independent cable lengths, the joint of the present invention is used during the production process of the cables which contain in their construction the above mentioned metallic tubes enclosing the optical fibers. This way it is also possible to use the joint of the present invention to cope with faults during the production of the metallic tube as well as during the first phase of the construction of such cables.

Also, unlike the joints of the prior art, the joint of the present invention is made of few parts, its construction does not require the use of a large number of specialized tools or highly skilled technicians, it is not complicated, it does not require presetting of equipment and therefore has high repeatability, having very low probability of errors and can be completed, in a short period of time.

It must also be noted that the joint under description provides to the completed submarine cable exactly the same flexibility and the same external diameter, in the area of its construction when compared to any other part of the cable, while at the same time its total length is rather small in relation to the external diameter of the cable. As a result, the handling of the joint during the operations of storage, loading and installation of the submarine cable is not different from the handling of the cable itself during these operations.

An embodiment of the invention will now be described by way of example and with reference to the accompanying figures.

It is noted that in the figures as well as in the description of the invention the metallic tubes carry a plastic coating before their connection since this case provides the possibility for a more complete description of the construction of the joint. In case the metallic tubes to be connected do not carry a plastic coating, the relevant steps of removing parts of the coating at the ends of the metallic tubes and restoring it later, over the connected metallic tubes, are simply ignored.

In order to assist the reader, identical reference numbers are used in the figures for the description of common elements.

Figure 5:
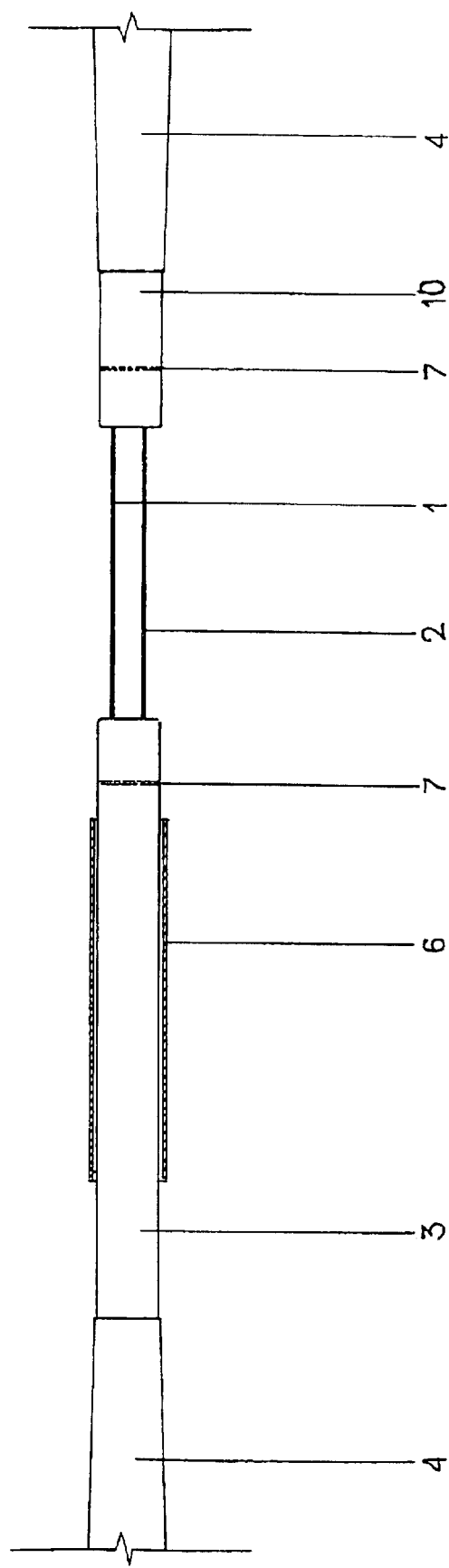

FIG. 5 indicates the position of the two metallic tubes to be connected after completion of the splicing of the two bundles of optical fibers. Also, FIG. 5 illustrates the marks applied on the external surface of the two metallic tubes at equal predetermined distances when measured from their ends.

Figure 6:
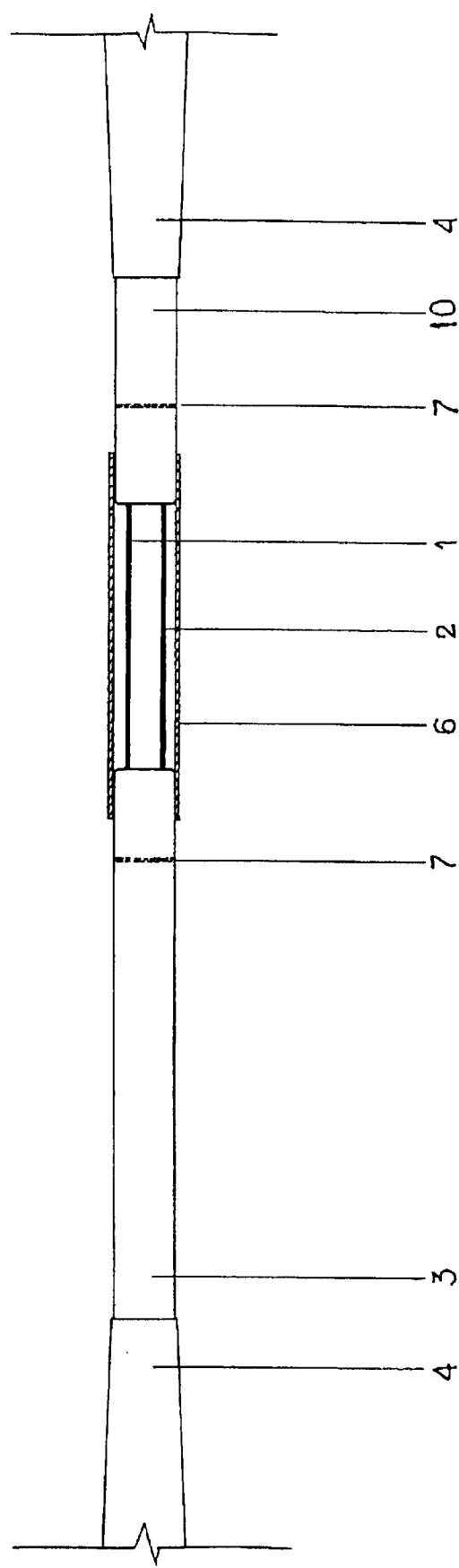

FIG. 6 indicates in cross-section the position over the spliced optical fibers at which the connecting metallic tube is placed, the ends of which are finally set at equal predetermined distances when measured from the marks applied on the external surface of the metallic tubes to be connected.

Figure 7:
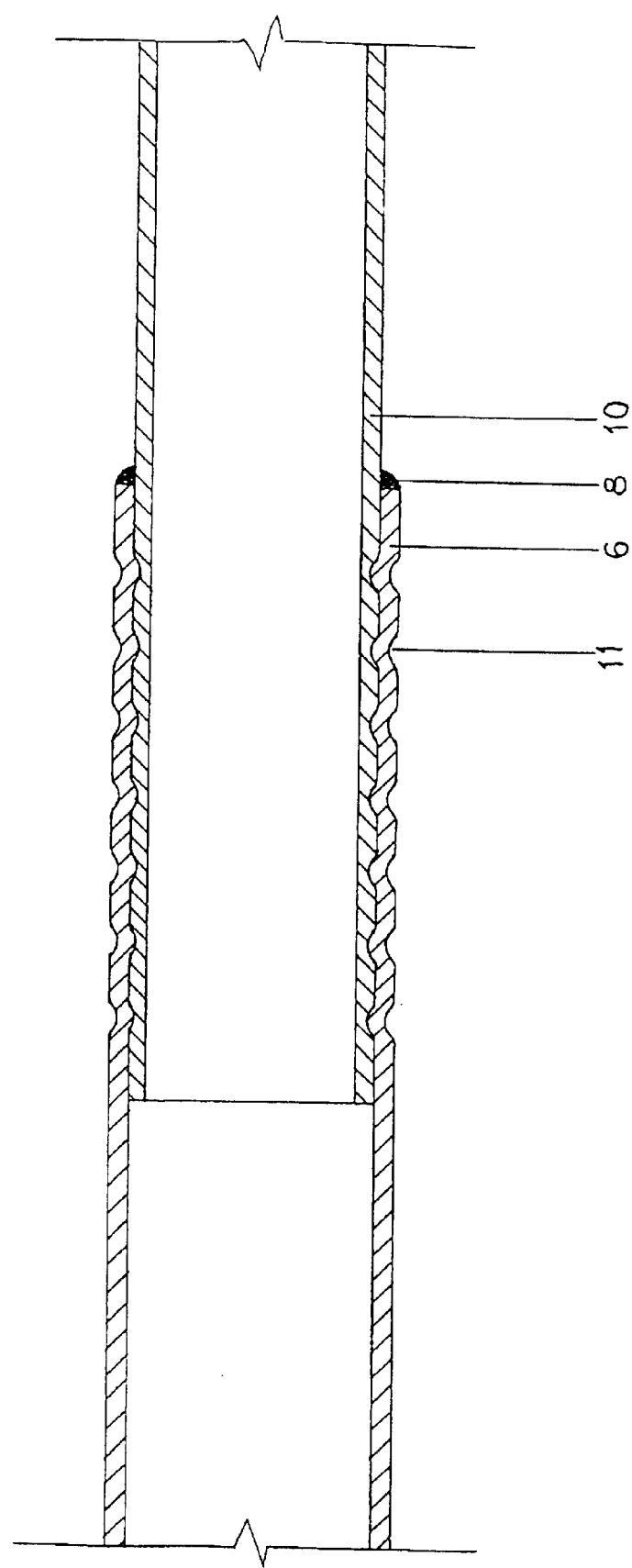

FIG. 7 illustrates in cross-section the grooved rings, which are created on the external surface of the connecting metallic tube, which bridges the metallic tubes to be connected at the sections where it overlaps them. Also, FIG. 7 illustrates the welding which is applied circumferentially between the ends of the over imposed connecting metallic tube and the external surface of the connected metallic tubes.

Figure 8:
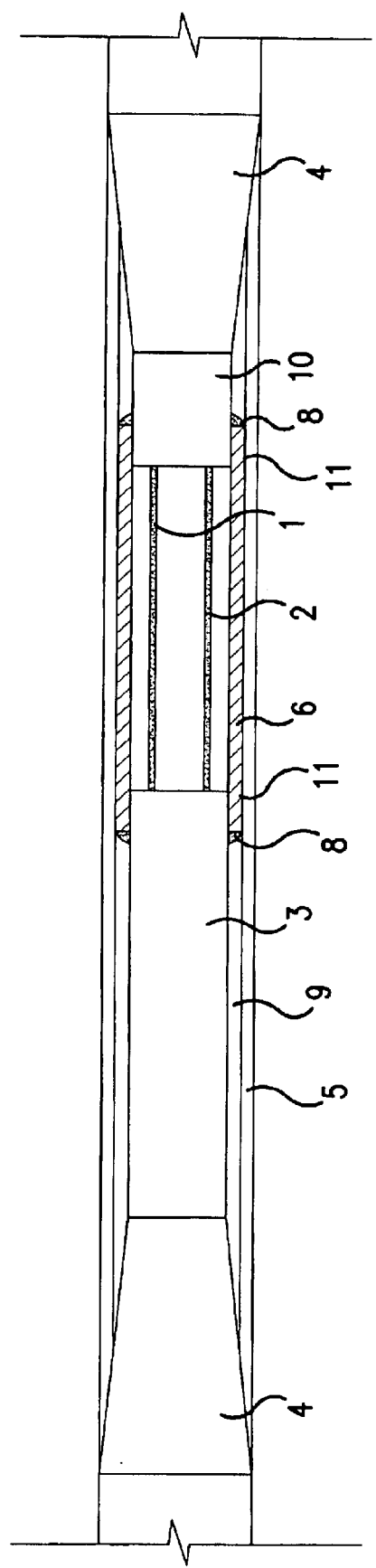

FIG. 8 illustrates in cross-section the completed factory joint and among other, the layer of the self-amalgamating plastic tape, which is applied over the metallic tubes and the final position of the heat-shrinkable tube, which is placed to cover the joint over its whole length.

Figure 1:
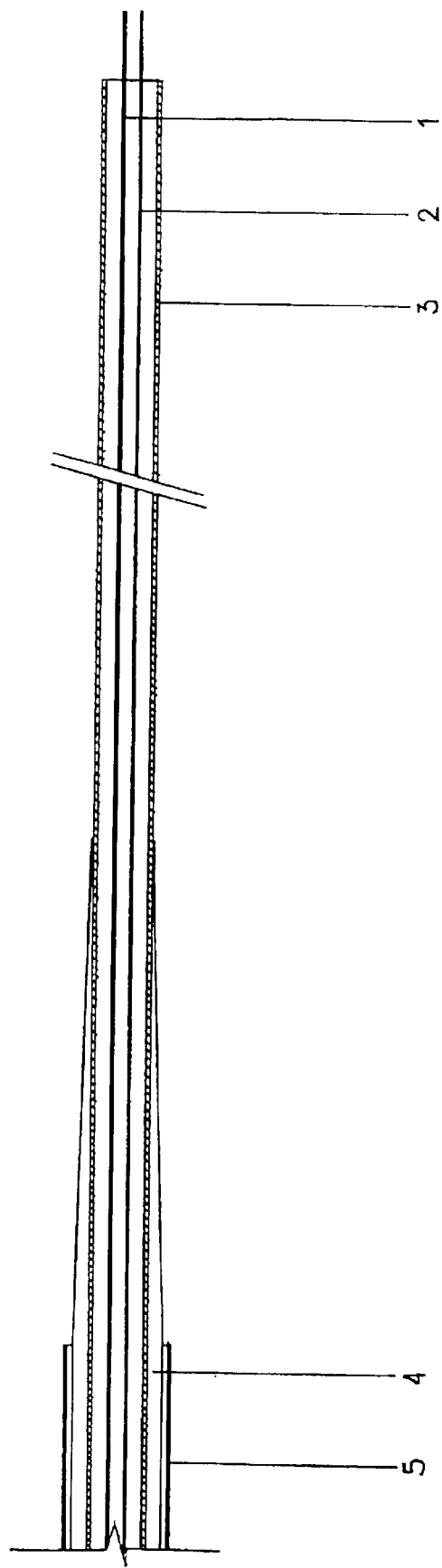
FIG. 1 illustrates in cross-section the initial stage of preparation before the realization of the connection of the first metallic tube to be connected, which encloses loosely inside it optical fibers separated in two bundles and which carries externally a plastic coating.

As shown in FIG. 1 a first metallic tube (3) to be connected is provided. This tube is made of steel and encloses loosely inside it 24 optical fibers. It has an internal diameter of 3,2 mm and an external diameter of 3,6 mm.

In order to uniquely identify the fibers inside the tube (3) the primary coating of each optical fiber is colored along its whole length with a different color in relation to the rest of the fibers.

In the present example,in order to uniquely identify the optical fibers, the coloured optical fibers are separated in 2 bundles that enclose fibers with the same colour sequence, while for the further identification of each bundle a thin coloured thread, which has a different colour for each bundle is applied helically over the bundle.

The two bundles of optical fibers (1) and (2), which are enclosed inside the first metallic tube to be connected (3) also appear in FIG. 1.

Inside the metallic tube (3) the optical fibers of bundles (1) and (2) are surrounded by a suitable filling material (gel) which protects them inside the tube from mechanical stress and moisture penetration.

The plastic coating (4) is removed from the first metallic tube (3) at a length of 1300 mm from its free end. This operation can be performed using any known method. However in the present example the plastic coating (4) is gradually removed in segments of approximately 300 mm each in length using a cutting device while simultaneously heating the coating (4) using hot air.

Following the above, the plastic coating (4) is gradually reduced in thickness, using an emery paper, towards the free end of the metallic tube (3) until the metallic tube (3) is completely uncovered.

As illustrated in FIG. 1 this gradual reduction of the thickness of the plastic coating (4) presents a conical shape. This conical section has a length of 30 mm.

In order to protect the external surface of the metallic tube (3) during the above operation it is possible to temporarily install over the tube (3) in contact with the end of the plastic coating (4) a small in length metallic tube with internal diameter larger than the external diameter of the metallic tube (3).

After the completion of the above-mentioned operation this metallic tube is removed. This metallic tube is not illustrated in FIG. 1.

Following the above a heat shrinkable plastic tube (5) having a length of 1700 mm is temporarily placed over the plastic coating (4) of the first metallic tube (3).

Figure 2:
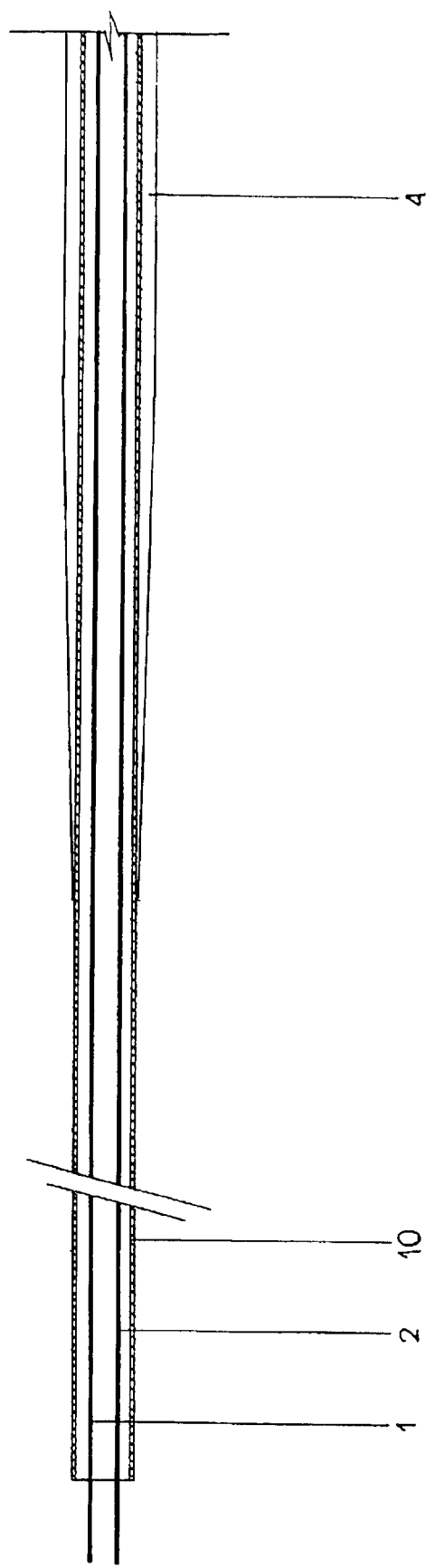
FIG. 2 illustrates in cross-section the initial stage of preparation before the realization of the connection of the second metallic tube to be connected, which encloses loosely inside it optical fibers separated in two bundles and which carries externally a plastic coating.

As illustrated in FIG. 2, a second metallic tube (10), identical to the first metallic tube (3) is provided. This will be connected to the first one (3) and encloses loosely inside it the same number of optical fibers in bundles (1) and (2), which are surrounded inside the tube (10) by a suitable filling material (gel).

The plastic coating is removed from the second metallic tube (10) at a length of 600 mm using the same method as described above for the first tube (3). As in the case of the first metallic tube (3), the thickness of the plastic coating (4) is gradually reduced at a length of 30 mm towards the free end of the second metallic tube (10).

Figure 3:
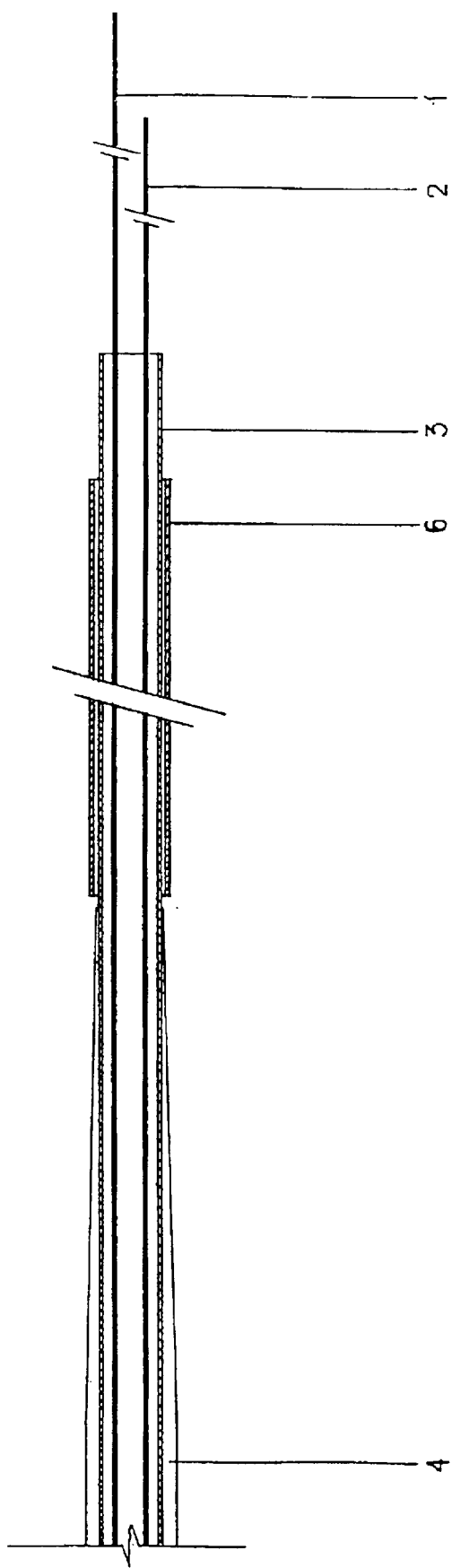
FIG. 3 illustrates in cross-section the final stage of preparation before the realization of the connection of the first metallic tube from which a part has been removed to reveal the enclosed optical fibers, which are cut at predetermined lengths per bundle when measured from the end of the metallic tube.

Then, as illustrated in FIG. 3, a connecting metallic tube (6), which will be used later to bridge externally with overlapping the metallic tubes to be connected (3, 10), is placed in a temporary position over the first metallic tube (3). This connecting tube has a length of 750 mm, an external diameter of 4,2 mm and an internal diameter of 3,8 mm in order to be able to move easily over the external surface of the metallic tubes to be connected.

The ends of the connecting metallic tube (6) have been lightly relieved open before its temporary positioning over the first metallic tube (3), so that its further movement over the metallic tube (3) is facilitated. The connecting tube (6) of the present example is made of nickel chrome steel. The material of said connecting tube (6) must have at least equal mechanical strength and similar electrical conductivity, as the material by which the metallic tubes to be connected (3, 10) are made of. Also the material of the connecting tube (6) must have the ability to undergo plastic deformation at the desirable degree so that the mechanical connection with the metallic tubes (3, 10) is achieved using the method, which is described below. Furthermore, this material must be suitable so that welding is possible with the metallic tubes (3, 10). Finally, this material has to provide to the connecting metallic tube (6) the necessary flexibility and the necessary crush strength under hydrostatic pressure in order to protect the optical fibers of bundles (1) and (2) at the same level when compared to the protection offered to them by the metallic tubes to be connected (3, 10).

The above mentioned properties in combination with the desirable thickness of the tube define the material by which the connecting metallic tube (6) will be made of as well as its external diameter.

Following the above, and as illustrated in cross-section in FIG. 3, a section is carefully cut from the end of the first metallic tube to be connected (3) so that the bundles of the enclosed optical fibers (1) and (2) are uncovered and the section that remains has a length of 850 mm when measured from the end of the conical section. This is performed by circumferentially carving the metallic tube (3) at the position where cutting will take place and by applying successive bends at the carving point. Then the internal surface of the metallic tube (3) is cleaned and lightly relieved open at the position where it has been cut.

At this point a metallic tube is temporarily placed over the optical fibers of bundles (1) and (2) at the position where the metallic tube (3) has been cut and inside it for a length of 100 mm from its free end. This metallic tube has an external diameter lightly smaller (3,0 mm) than the internal diameter of the metallic tube (3) and an internal diameter of 2,5 mm, which will allow to the optical fibers of bundles (1) and (2) to move freely inside it. This metallic tube is not illustrated in FIG. 3 and is used exclusively for the protection of the optical fibers from any sharp point, which may be created during the cutting of the metallic tube to be connected (3).

Finally after smoothing all surfaces at the position of the cut the above mentioned metallic tube is carefully removed over the optical fibers of bundles (1) and (2).

Following the above, each bundle of optical fibers (1) and (2) is cut at a predetermined length when measured from the end of the metallic tube to be connected (3). In the present example the resulting lengths for the uncovered bundles of optical fibers enclosed in the first metallic tube (3) are 390 mm for the first bundle (1) and 320 mm for the second bundle (2).

Figure 4:
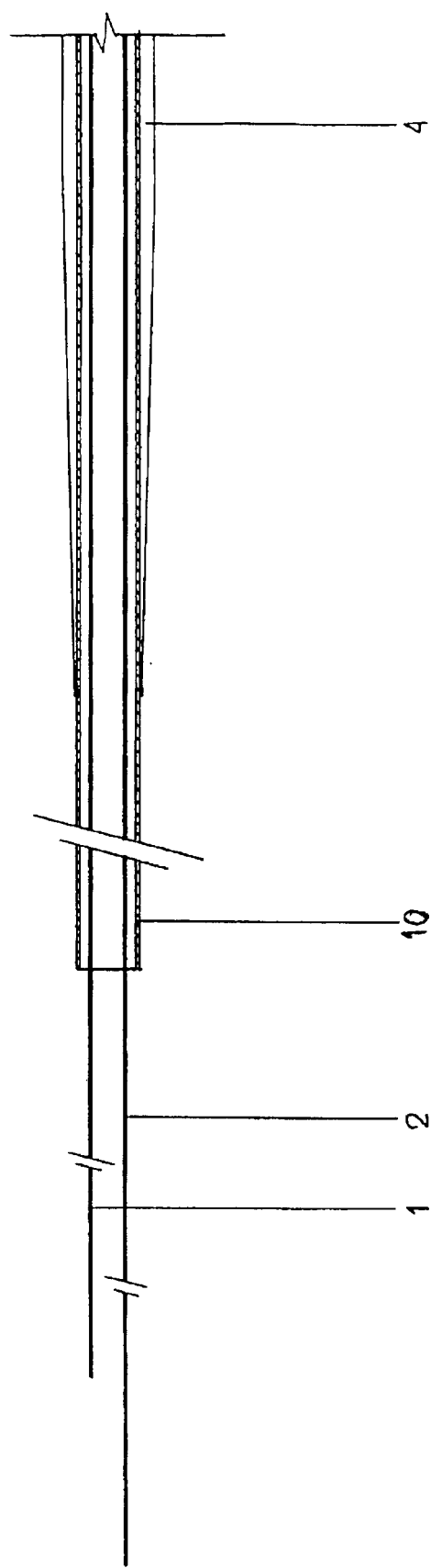
FIG. 4 illustrates in cross-section the final stage of preparation before the realization of the connection of the second metallic tube from which a part has been removed to reveal the enclosed optical fibers, which are cut at predetermined lengths per bundle when measured from the end of the metallic tube.

As illustrated in cross-section in FIG. 4 a section is carefully cut from the end of the second metallic tube to be connected (10), using the same method as for the first metallic tube (3), so that the bundles of the enclosed optical fibers (1) and (2) are uncovered and the section that remains has a length of 100 mm when measured from the end of the conical section.

Following the above, each bundle of optical fibers (1) and (2) of the second metallic tube (10) is cut at a predetermined length when measured from the end of said tube. In the present example the resulting lengths for the uncovered bundles of optical fibers enclosed in the second metallic tube (10) are 320 mm for the first bundle (1) and 390 mm for the second bundle (2).

This way the total length of each bundle of optical fibers (1) or (2) which will result after splicing will be the same. Also, by choosing the lengths of the two bundles of optical fibers (1) and (2) so that the sum of their lengths at each end to be connected is less than the length of the connecting metallic tube (6), the external overlapping of the connecting metallic tube (6) over the ends of the two metallic tubes to be connected (3, 10) is achieved after splicing of the fibers and placing the metallic tube (6) at its final position.

The splicing of the optical fibers of bundles (1) and (2) is performed following any commonly used method for this purpose. After completion of the splicing of the optical fibers of bundles (1) and (2) the ends of the metallic tubes (3, 10) are moved away from each other so that the optical fibers are aligned.

Following the above, and as illustrated in FIG. 5 two marks (7) are applied on the external surface of the metallic tubes (3, 10) at a distance of 90 mm from the end of each of said tubes.

These marks will be used later to control the length of the sections by which the connecting metallic tube (6) overlaps the metallic tubes to be connected (3, 10) and to finally control the excess length of the optical fibers of bundles (1) and (2) inside the joint.

The initial distance between the marks (7) is obviously greater than the length of the connecting metallic tube (6). It is always desirable that this length difference is greater than 80 mm.

When the optical fibers of bundles (1) and (2) are completely aligned the exact distance x (830 mm) between the two ends of the metallic tubes to be connected (3, 10) is measured.

The first metallic tube (3) is moved by a distance y (3 mm) towards the second metallic tube so that the optical fibers become loose and the desirable excess length of the optical fibers is obtained within the joint. This length y (3 mm) is calculated so that the ratio y/(x-y) % is equal to the desirable excess length of the optical fibers inside the joint.

A filling material (gel) same as the one surrounding the optical fibers inside the metallic tubes (3, 10) is then placed over the optical fibers of bundles (1) and (2).

The connecting metallic tube (6) is moved from its temporary position, indicated in FIG. 5, over the first metallic tube (3) and the bundles of the optical fibers (1) and (2) so that it overlaps the end of the second metallic tube (10) by 50 mm. The new position of the metallic tube (6) is illustrated in FIG. 6.

During the above operation it is verified that the distance between the ends of the metallic tubes (3, 10) overlapped by the connecting metallic tube (6) has not changed and consequently the excess length of the optical fibers of bundles (1) and (2) has not been altered inside the joint.

This is achieved by measurement of the distance between the marks (7) which has to be the initially measured one x (830 mm) reduced by y (3 mm).

Also without moving the metallic tubes (3, 10) the position of the connecting metallic tube (6) is set so that the distances between its ends and the marks (7) are equal (40 mm). This way the sections by which the connecting metallic tube (6) overlaps the metallic tubes (3, 10) are equal (50 mm).

When the position of the metallic tube (6) is finalized it is necessary to secure its connection to the metallic tubes (3, 10) so that the required mechanical strength of the joint is achieved.

As illustrated in FIG. 7 this is achieved through plastic deformation by creating grooved rings (11) having a diameter, smaller than the external diameter of the connecting metallic tube (6), on the overlapping sections of the connecting metallic tube (6) which will ensure the mechanical cohesion with the connected metallic tubes (3, 10). The above-mentioned grooved rings (11) are created on the external surface of the connecting metallic tube (6).

The diameter of the grooved rings (11), their number and the distances between them are defined by the dimensions of the tubes (3, 10) and (6) and by the materials by which they are made of.

In the present example, where the first and second metallic tubes (3, 10) are made of steel and the connecting tube (6) is made of nickel chrome steel, the number of grooved rings is 7 and the distance between them is 5 mm. Their diameter is 3,9 mm.

In the present case it has been observed that should the diameter of the grooved rings (11) be 3.8 mm, small irregularities would be created on the internal surface of the metallic tubes (3, 10). Consequently using for safety reasons a diameter of 3.9 mm for the grooved rings, the required tensile load before separation between the metallic tubes (3) and (10) has been verified to amount to 170 Kp which corresponds to more than the 75% of the breaking loading of the metallic tubes (3, 10). At the same time the elongation of the connection before separation exceeds the design requirements for the cables, which may include in their construction the above mentioned metallic tubes (3, 10). Bending tests performed in the area of the joint verified that its minimum bending radius is compared to the bending radius of the metallic tubes (3, 10) and by far exceeds the design requirements for the cables, which may include in their construction the above mentioned metallic tubes (3, 10). The flexibility and strength at the area of the joint is therefore the same as that of any other part of the cable which contains the metallic tubes enclosing the optical fibers.

To complete the connection and as indicated in FIG. 7 a metal alloy welding is exclusively applied circumferentially between the ends (8) of the connecting metallic tube (6) and the external surface of the metallic tubes (3, 10). This way the complete water tightness of the joint is achieved.

To complete the construction of the joint, a cross-section of which is illustrated in FIG. 8, the restoration of the plastic coating (4) is performed over the joint. This is achieved by applying one or more layers of selfamalgamating plastic tape (9) over the connected metallic tubes (3, 10) and if required over the connecting metallic tube (6) so that the whole length of the joint is covered and the external diameter of the plastic coating (4) is uniformly restored.

Finally, the heat shrinkable plastic tube (5) is transferred from its temporary position, illustrated in FIG. 1, and is placed over the joint so that it covers its whole length to the points from which the gradual reduction of the plastic coating begins. Following the above, the heat shrinkable plastic tube (5) is reduced by heating. Its final position is illustrated in FIG. 8. This way the plastic coating (4) is restored at the desirable thickness and the construction of the joint is completed.

What is claimed is:

1. Flexible factory joint for metallic tubes, which enclose loosely inside them optical fibers, comprising:

first and second metallic tubes (3, 10) having internal and external diameter, which enclose loosely inside them optical fibers, said optical fibers surrounded by a suitable filling material, separated in one or more bundles (1, 2) and spliced together at their ends, and a connecting metallic tube (6) having an internal and external diameter, said internal diameter being slightly larger than the external diameter of each of the first and second metallic tubes (3, 10), placed in a way such that it encloses the spliced optical fibers and externally overlaps an end section of each of the above first and second metallic tubes (3, 10), and is characterized in that the connecting tube (6) is firmly connected to the first and second metallic tubes (3, 10) at the sections at which it overlaps them, through the creation by plastic deformation of more than one grooved rings (11) which have a diameter smaller than the external diameter of the connecting tube (6).

2. Flexible factory joint for metallic tubes, which enclose loosely inside them optical fibers, according to claim 1, wherein the diameter, the number and the distance between said grooved rings (11) differ, depending on the type of the material by which said first and second metallic tubes (3, 10) and said connecting metallic tube (6) are made of, so that the required mechanical strength at the connecting points can be achieved.

3. Flexible factory joint for metallic tubes, which enclose loosely inside them optical fibers, according to claim 1, wherein the ends of the connecting tube (6) are circumferentially externally welded on the of the first and second metallic tubes (3, 10) thus achieving the complete water tightness of the joint.

4. Flexible factory joint for metallic tubes, which enclose loosely inside them optical fibers, according to any of claims 1 to 3, wherein said first and second metallic tubes (3, 10) carry a plastic coating (4), which is progressively reduced in thickness and further completely removed towards the connected end of each metallic tube (3, 10).

5. Flexible factory joint for metallic tubes, which enclose loosely inside them optical fibers, according to claim 4, wherein the first and second metallic tubes (3, 10) and the connecting tube (6) are enclosed within one or more layers of self amalgamating plastic tape (9) and a heat shrinkable plastic tube, (5) which contribute to the restoration of the plastic coating (4) at the desirable thickness in the area of the joint.

6. Flexible factory joint for metallic tubes, which enclose loosely inside them optical fibers, according to claim 5, wherein when said joint is enclosed inside a cable which contains the connected metallic tubes, it is surrounded by successive protective layers in exactly the same way as the said metallic tubes are surrounded in the rest of the cable so that no discontinuity is created between these layers during the manufacture of said cable in the area of the joint, thus ensuring in this area the optical, mechanical and electrical properties of the cable.

7. Flexible factory joint for metallic tubes, which enclose loosely inside them optical fibers, according to claim 6, wherein when the joint is enclosed inside a cable, the external diameter of the cable in the area of the joint is the same as in any other part of the cable.

8. Method for making a flexible factory joint for metallic tubes, which enclose loosely inside them optical fibers, comprising the following steps:
   a. Providing first and second metallic tubes to be connected (3, 10), having internal and external diameter, said tubes enclosing loosely inside them optical fibers surrounded by a suitable filling material and further providing a connecting metallic tube (6) having an internal land external diameter, said internal diameter being slightly larger than the external diameter of each of the first and second metallic tubes (3, 10),
   b. Positioning temporarily the connecting metallic tube (6) along its whole length over the first metallic tube to be connected (3)
   c. Cutting out sections at the ends of the metallic tubes to be connected (3, 10) in order to uncover the enclosed optical fibers
   d. Separating the optical fibers in one or more bundles (1,2) each one of them including a maximum number of 12 optical fibers
   e. Cutting each bundle of the fibers at predetermined lengths, depending on the number of the optical fibers enclosed inside the metallic tubes, such that the total length of each bundle after splicing will be the same and the total length of two spliced bundles will be shorter than the length of the connecting metallic tube (6)
   f. Splicing the optical fibers following commonly used methods for this purpose
   g. Arranging the metallic tubes to be connected (3, 10) after the splicing of the optical fibers, so that the fibers are horizontally aligned, and subsequently reducing the distance between them at a predetermined length, such that the optical fibers become loose and this way the desirable excess length of the optical fibers is ensured inside the joint,
   h. Applying a filling material over the optical fibers, same as the one surrounding the optical fibers inside the metallic tubes to be connected (3, 10).
   i. Moving the connecting metallic tube (6) over the first metallic tube to be connected (3), the spliced optical fibers (1, 2) and the second metallic tube to be connected (10) so that it overlaps the ends of the metallic tubes to be connected (3, 10) by equal sections.
   j. Securing the stability of the connection through the creation, by plastic deformation, at the sections at which the connecting metallic tube overlaps the metallic tubes (3, 10) to be connected, of more than one grooved rings (11) which have a diameter smaller than the external diameter of the connecting tube (6) k. Welding (8) circumferentially the ends of the connecting tube (6) to the external surface of the connected metallic tubes (3, 10) so that complete water tightness of the joint is achieved.

9. Method for making a flexible factory joint for metallic tubes, which enclose loosely inside them optical fibers, according to claim 8, wherein in case the metallic tubes to be connected (3, 10) carry a plastic coating (4), the following preliminary steps precede:
   a. Removing completely part of the plastic coating (4), at the ends of each one of the metallic tubes to be connected (3, 10)
   b. Gradually reducing in thickness part of the remaining plastic coating (4) towards the ends of the metallic tubes (3, 10) until each metallic tube (3, 10) is completely uncovered and so that the reduced segment of the plastic coating (4) has a conical shape,
   c. Placing temporarily a heat shrinkable plastic tube (5) over the plastic coating (4) of the first metallic tube to be connected (3).

10. Method for making a flexible factory joint for metallic tubes, which enclose loosely inside them optical fibers according to claim 8 or claim 9, wherein in case the metallic tubes to be connected (3, 10) carry a plastic coating (4), the following final steps follow aiming to the restoration of the plastic coating (4) at the desirable thickness:
   a. Applying one or more layers of self amalgamating plastic tape (9) over the connected metallic tubes (3, 10) and if required over the connecting metallic tube (6)
   b. Moving the heat shrinkable plastic tube (5) from its temporary position and placing it so that it covers the joint over its whole length
   c. Shrink the above mentioned heat shrinkable plastic tube (5) by heating.

* * * * *